(12) United States Patent
Gwalani

(10) Patent No.: US 12,242,127 B2
(45) Date of Patent: Mar. 4, 2025

(54) MOBILE PHONE FILTER ASSEMBLY

(71) Applicant: Freewell Industry Company Limited, Hong Kong (HK)

(72) Inventor: Hitesh Gopal Gwalani, Nagpur (IN)

(73) Assignee: Freewell Industry Company Limited, Hong Kong (HK)

( * ) Notice: Subject to any disclaimer, the term of this patent is extended or adjusted under 35 U.S.C. 154(b) by 151 days.

(21) Appl. No.: 18/067,027

(22) Filed: Dec. 16, 2022

(65) Prior Publication Data

US 2024/0201465 A1 Jun. 20, 2024

(51) Int. Cl.
*G02B 7/00* (2021.01)
*G02B 7/02* (2021.01)
*H04M 1/02* (2006.01)
*H04N 23/55* (2023.01)

(52) U.S. Cl.
CPC ............. *G02B 7/006* (2013.01); *G02B 7/026* (2013.01); *H04M 1/0264* (2013.01); *H04N 23/55* (2023.01)

(58) Field of Classification Search
None
See application file for complete search history.

(56) References Cited

U.S. PATENT DOCUMENTS

| 2020/0183255 A1* | 6/2020 | Gwalani | G02B 7/022 |
| 2021/0132320 A1* | 5/2021 | Gwalani | G02B 7/006 |

FOREIGN PATENT DOCUMENTS

| CN | 210691007 U | * | 6/2020 | |
| CN | 211786520 U | * | 10/2020 | |
| CN | 212060841 U | * | 12/2020 | |
| CN | 215416231 U | * | 1/2022 | |
| CN | 215910773 U | * | 2/2022 | |
| CN | 218567807 U | * | 3/2023 | |
| CN | 218675637 U | * | 3/2023 | |
| WO | WO-2022222520 A1 | * | 10/2022 | ............... G02B 7/00 |

OTHER PUBLICATIONS

Translation of CN211786520U (Year: 2020).*
Translation of CN212060841U (Year: 2020).*
Translation of CN215910773U (Year: 2022).*
Translation of CN218567807U (Year: 2023).*
Translation of CN218675637U (Year: 2023).*
Translation of WO2022222520A1 (Year: 2020).*
Definition and properties of Mylar Title: BoPET (biaxially-oriented polyethylene terephthalate) Web: https://web.archive.org/web/20210205034944/https://en.wikipedia.org/wiki/BoPET (Year: 2021).*

* cited by examiner

Primary Examiner — Twyler L Haskins
Assistant Examiner — Wesley J Chiu

(57) ABSTRACT

A mobile phone filter assembly is disclosed. The mobile phone filter assembly comprises of a fixing assembly, and a filter assembly. The fixing assembly comprises of a base, at least one magnet, and a MYLAR™ film. The base comprises of a base front side, a base rear side, and a plurality of positioning holes. The at least one magnet is disposed towards the base rear side. The MYLAR™ film is disposed over the at least one magnet towards the base rear side. The filter assembly comprises a filter ring, a filter component and a filter press ring. The filter ring is configured to be detachably coupled to the base. The filter component is configured to be received by the filter ring. The filter press ring is configured to be received over the filter component, wherein the filter press ring is configured to hold the filter component in its place.

13 Claims, 6 Drawing Sheets

MOBILE PHONE FILTER ASSEMBLY

BACKGROUND

Field of Invention

The subject matter in general relates to a filter equipment, in particular to a mobile phone filter for capturing image on a mobile phone.

Discussion of Prior Art

The existing mobile phone filters available in the market have single function i.e., they fail to provide multiple filter effects and further fail to perform as desired by the user. Most of the available mobile phone filters doesn't allow combined use of variety of filters with different functions, which enriches the shooting experience. The employment of variety of filters with different functions provide the flexibility of altering the light being captured through a camera lens, thereby giving a desired output.

With the conventional camera filters, the user is forced to carry multiple heavy attachments along with them if the user wishes to capture an image with multiple filter effects. Most of the existing mobile phone filters are large in size and are equivalent to an external accessory of the mobile phone which is undesirable to carry around. Further, the heavy and expensive external accessories reduce the efficiency of the user capturing the images, as using these lens becomes very cumbersome and tiring, wherein the user is required to install or replace the lenses every time he requires a particular shot. The available mobile phone filters are difficult to install, and the user's time is wasted in installation rather than capturing the desired moments.

In light of the drawbacks of the conventional mobile phone filters, there is a requirement of a more efficient mobile phone filter capable of addressing the above-mentioned draw backs.

SUMMARY

In an embodiment, a mobile phone filter assembly for capturing image on a mobile phone is disclosed. The mobile phone filter assembly may comprise of a fixing assembly, and a filter assembly. The fixing assembly may comprise of a base, at least one magnet, and a MYLAR™ film. The base may comprise of a base front side, a base rear side, and a plurality of positioning holes, wherein the positioning holes may be provided towards a circumference of the base. The at least one magnet may be disposed towards the base rear side. The MYLAR™ film may be disposed over the at least one magnet towards the base rear side. The filter assembly may be configured to be detachably coupled to the fixing assembly. The filter assembly may comprise of a filter ring, a filter component, and a filter press ring. The filter ring may be configured to be detachably coupled to the base of the fixing assembly. The filter component may be configured to be received by the filter ring. The filter press ring may be configured to be received over the filter component, wherein the filter component is sandwiched between the filter ring and the filter press ring, wherein the filter press ring may be configured to hold the filter component in its place.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
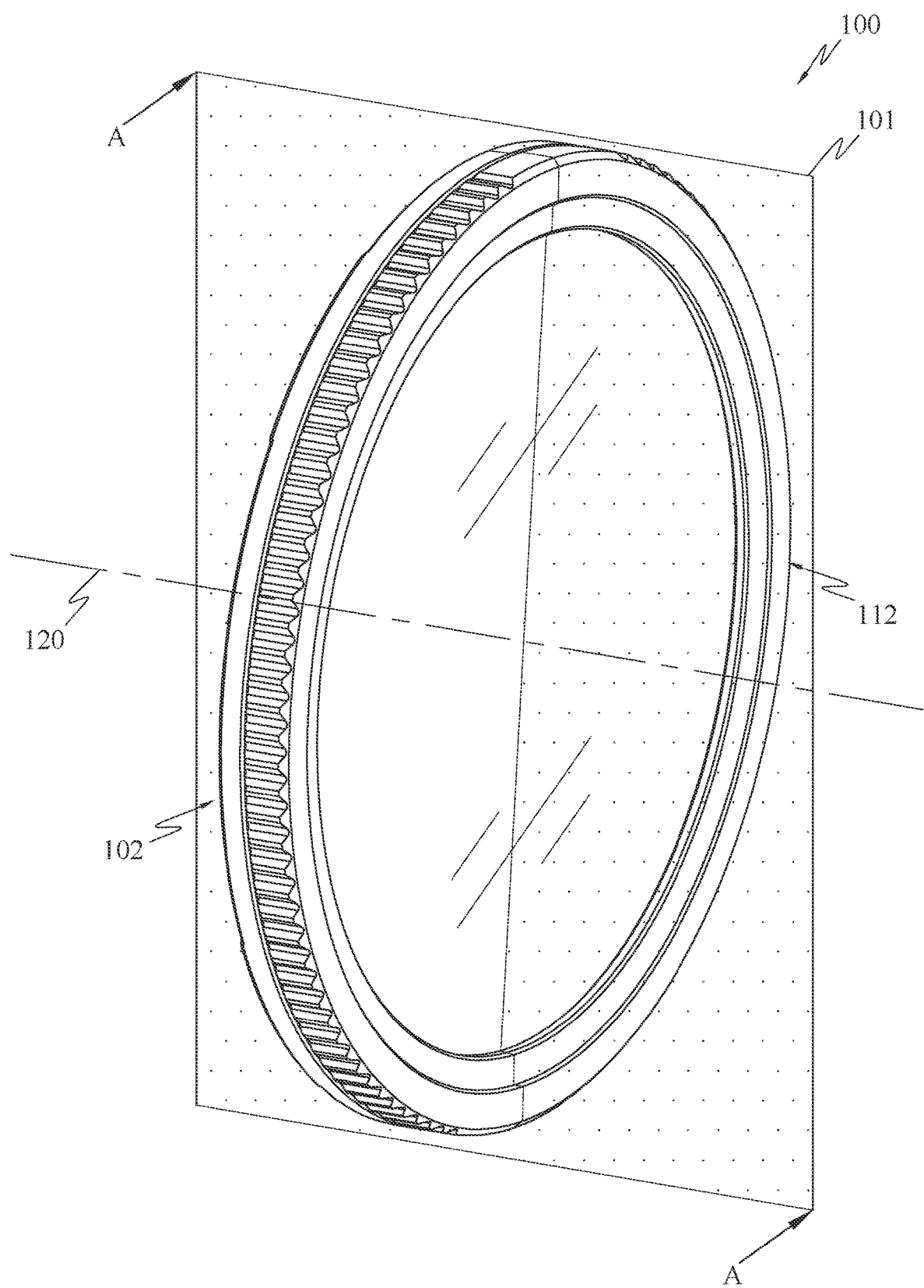
FIG. 1A illustrates a mobile phone filter assembly 100 for a mobile phone along with a section plane A-A 101.
Figure 1B:
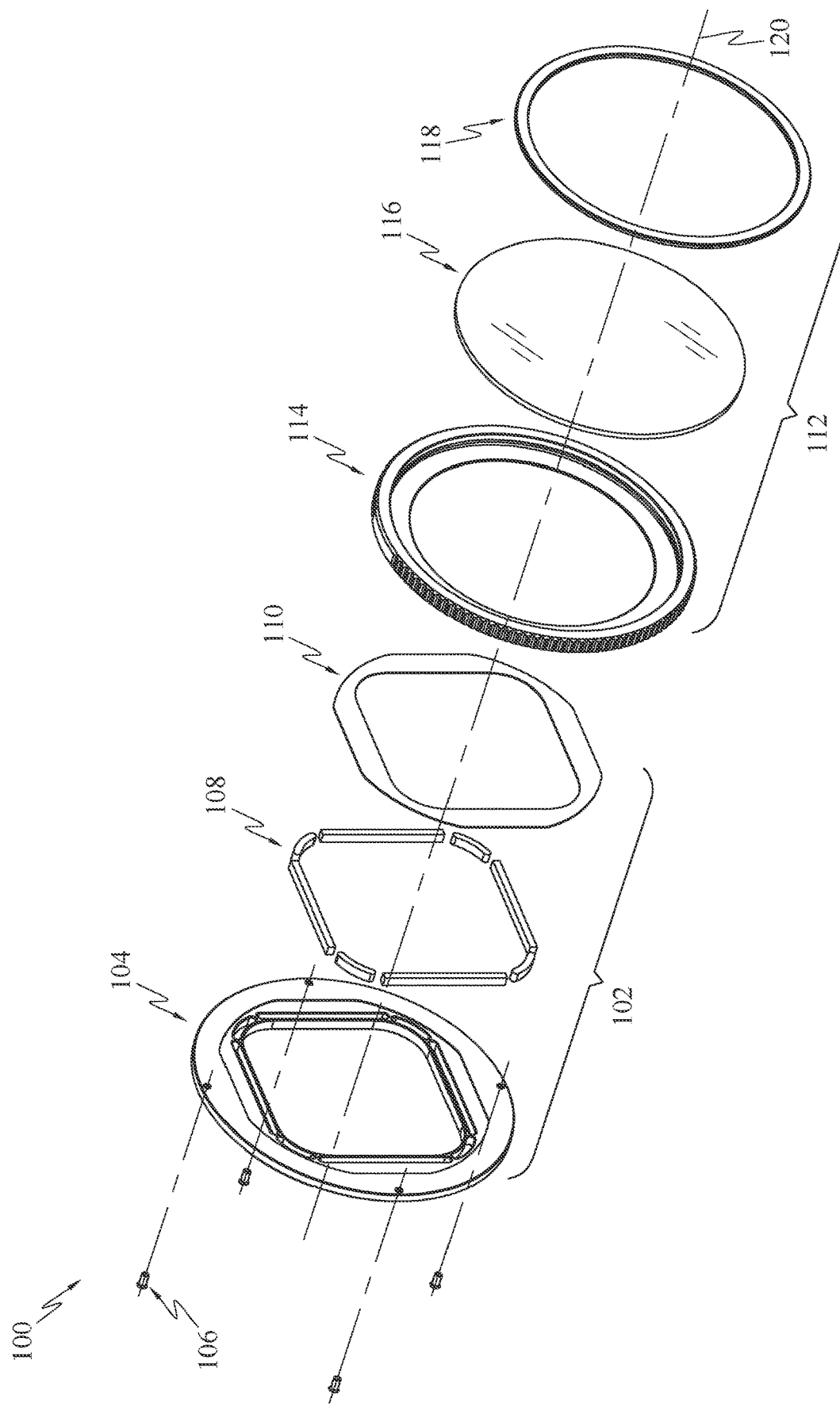
FIG. 1B illustrates an exploded perspective view of the mobile phone filter assembly 100 for the mobile phone.

FIG. 1A illustrates a mobile phone filter assembly 100 for a mobile phone along with a section plane 101, in accordance with an embodiment. FIG. 1B illustrates an exploded perspective view of the mobile phone filter assembly 100 for the mobile phone, in accordance with an embodiment.

Referring to FIGS. 1A and 1B, the mobile phone filter assembly 100 may comprise of a fixing assembly 102, a plurality of screws 106, and a filter assembly 112. Each of the elements or components of the mobile phone filter assembly 100 may comprise of a front side and a rear side.

The filter assembly 112 may be configured to be detachably coupled to the fixing assembly 102. Further, the filter assembly 112 may be detachably coupled to a mobile phone case (not shown) via the fixing assembly 102. The fixing assembly 102, and the filter assembly 112 may be aligned along a central axis 120, wherein the central axis 120 passes through the center of the fixing assembly 102, and the filter assembly 112.

In an embodiment, the fixing assembly 102 may comprise of a base 104, at least one magnet 108 and a polyester film 110 that is a MYLAR™ film. The MYLAR™ is a BoPET (biaxially-oriented polyethylene terephthalate) film which is a polyester film made from stretched polyethylene terephthalate PET. This polyester film may be used for its high tensile strength, chemical and dimensional stability, transparency, reflectivity, gas and aroma barrier properties, and electrical insulation. The base 104 may comprise of a base front side 208 and a base rear side 210. The at least one magnet 108 may be disposed towards the base rear side 210. The mylar film 110 may be disposed over the at least one magnet 108 towards the base rear side 210.

In an embodiment, the filter assembly 112 may comprise of a filter ring 114, a filter component 116, and a filter press ring 118. The filter ring 114 may be configured to be detachably coupled to the base 104 of the fixing assembly 102. The filter component 116 may be configured to be received by the filter ring 114. The filter press ring may be configured to be received by the filter ring 114, over the filter component 116.

Figure 2:
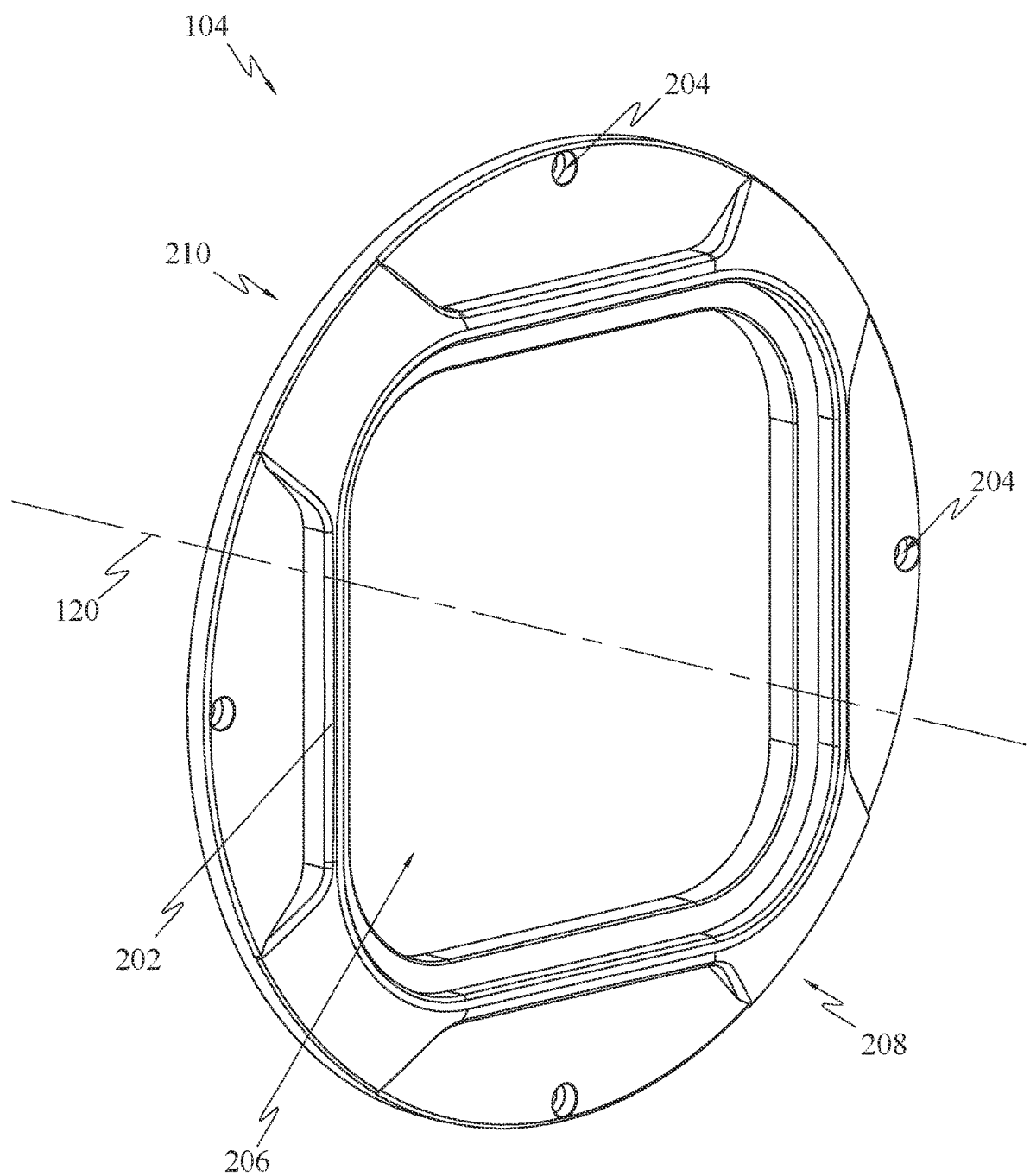
FIG. 2 illustrates a perspective view of a base front side 208 of a base 104 of the mobile phone filter assembly 100.

FIG. 2 illustrates a perspective view of the base front side 208 of the base 104 of the fixing assembly 102, in accordance with an embodiment. As shown in FIG. 2, the base 104 may comprise of plurality of positioning holes 204. The plurality of positioning holes 204 may be provided towards a circumference of the base away from the central axis 120. Each of the positioning holes 204 may be configured to receive screw 106, when the filter assembly 112 and the fixing assembly 102 are assembled.

In an embodiment, the base 104 may define a first aperture 206 extending away from center of the base 104, wherein the first aperture 206 is configured to allow light to pass through it. The first aperture may define, but not limited to, a rectangular shape. The base 104 may be provided with a first protrusion 202 towards the base front side 208. The first protrusion 202 may extend away from the base front side 208. The first protrusion 202 may enable the base 104 to be detachably coupled to an external component, wherein the external component may be an electronic device with a camera setup such as, but not limited to a mobile phone, laptop, and digital camera. The first protrusion 202 may be provided along the circumference of the first aperture 206.

In an alternate embodiment, first protrusion along with the magnets or only the magnets of base of the fixing assembly may be configured to enable coupling of the fixing assembly with any external component, wherein the external component may be an electronic device with a camera setup such as, but not limited to a mobile phone, laptop, and digital camera. The external component may be provided with at least one magnet or at least one ferromagnetic material in a manner that the magnets provided with the fixing assembly may be magnetically coupled to the at least one magnet or the at least one ferromagnetic material provided with the external component.

In an embodiment, the mobile phone case may be provided with a protrusion that may be configured to align and interface with at least an inside portion of the first protrusion 202 to allow the base 104 to couple with the mobile phone case.

Figure 3:
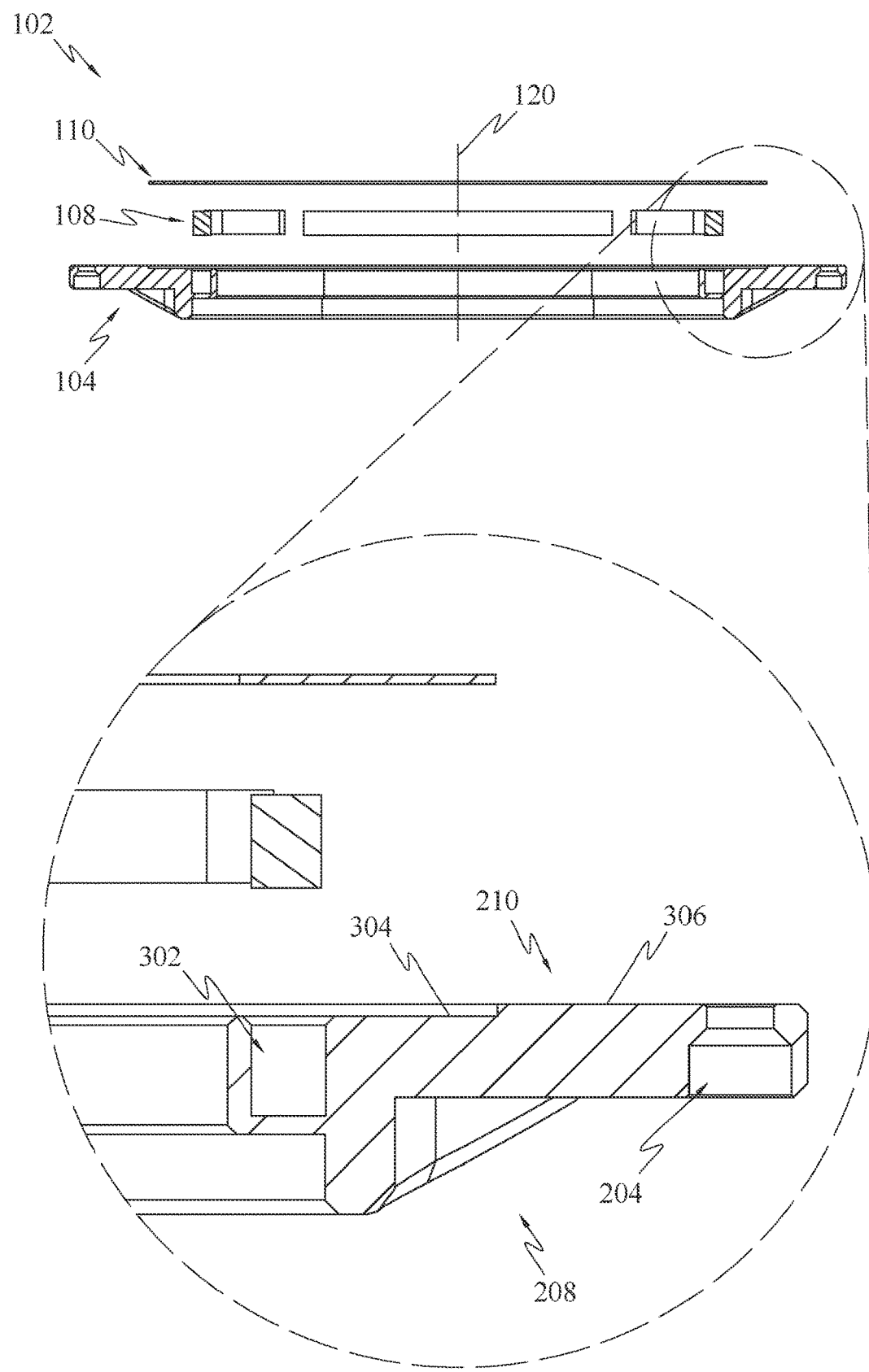
FIG. 3 illustrates a detailed cross-sectional view of the base 104, magnets 108 and a MYLAR™ film 110 of a fixing assembly 102 taken along a section plane A-A 101 as shown in FIG. 1.

FIG. 3 illustrates a detailed cross-sectional view of the base 104, magnets 108 and the MYLAR™ film 110 of the fixing assembly 102 taken along the section plane A-A 101 as shown in FIG. 1, in accordance with an embodiment. The base rear side 210 may comprise of a first groove 302, and a first platform 304. The base 104 may define the first groove 302 towards the base rear side 210. The first groove 302 may be configured to receive the at least one magnet 108, wherein the width of the magnet 108 may be, but not limited to, same as the width of the first groove 302. The at least one magnet 108 may be engaged to a bottom surface of the first groove 302 using any known adhesives.

In an alternate embodiment, at least one groove may be provided towards the base rear side of a base of fixing assembly, wherein multiple small sized first grooves may be disposed along a circumference of a first aperture of the base.

In an embodiment, the base 104 may define a first platform 304 towards the base rear side 210 around the central axis 120, more particularly around the first groove 302, wherein the first platform 304 extends away from the first groove 302. The first platform 304 may be configured to receive the MYLAR™ film 110.

In an embodiment, the base 104 may define a second platform 306 towards the base rear side 210 around the central axis 120, more particularly around the first platform 304, wherein the second platform 306 extends away from the first platform 304. Further, the second platform 306 may extend over the first platform 304 along the central axis 120, in a manner that the second platform 306 is at a height raised over the first platform 304.

In an embodiment, at least a portion of the filter ring 114 may be configured to overlap at least a portion of the MYLAR™ film 110 and the second platform 306, when the mobile phone filter assembly 100 is assembled. The mylar film 110 may be engaged to the first platform 304 using any known adhesives. The MYLAR™ film 110 may be configured to enable positioning of the plurality of magnets 108 within the first groove 302. When the fixing assembly 102 is assembled, at least a portion of the MYLAR™ film 110, towards the central axis 120, may overlap at least a portion of the first groove 302. Further, at least a portion of the MYLAR™ film 110, away from the central axis 120, may overlap at least a portion of the first platform 304. The overlapping of the MYLAR™ film 110 over the first groove 302 and the first platform 304 allows the plurality of magnets 108 to be held in position.

Figure 4:
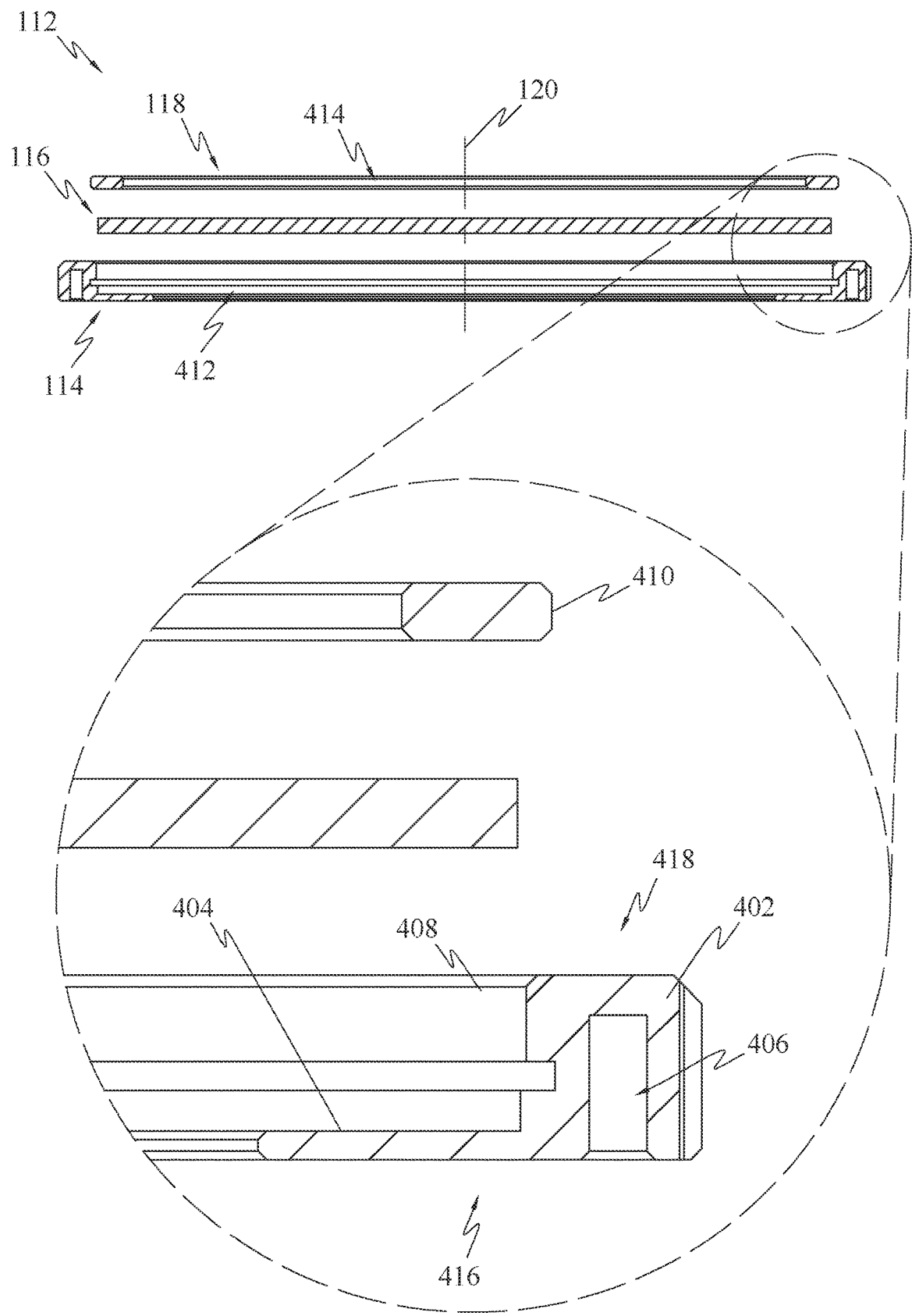
FIG. 4 illustrates a detailed cross-sectional view of a filter ring 114, a filter component 116, and a filter press ring 118 of a filter assembly 112 taken along the section plane A-A 101.

FIG. 4 illustrates a detailed cross-sectional view of the filter ring 114, the filter component 116, and the filter press ring 118 of the filter assembly 112 taken along the section plane A-A 101, in accordance with an embodiment.

In an embodiment, the filter ring 114 may comprise of a filter ring front side 416 and a filter ring rear side 418. The filter ring 114 may define a second aperture 412 extending away from center of the filter ring 114. The second aperture 412 may be configured to allow light to pass through it. The filter ring rear side 418 may comprise of a second protrusion 402. The filter ring rear side 418 may define a third platform 404, wherein the third platform 404 may be configured to receive the filter component 116. The second protrusion 402 may extend in a direction parallel to the central axis 120 and away from the third platform 404.

In an embodiment, the filter component 116 may be made of, but not limited to, glass material.

In an embodiment, at least a portion of the second protrusion 402, towards the second platform 404, may define a first threaded portion 408 (threads have not been shown in the figures). The second protrusion 402 may be provided with at least one hole 406, towards the filter ring front side 416. At least a portion of the at least one hole 406 may define internal threads. The at least one hole 406 may be configured to receive at least one screw 106 for detachably coupling the fixing assembly 102 to the filter assembly 112, wherein at least a portion of each of the screw 106 may define a threaded portion (external threads). The filter press ring 118 may be configured to be received over the filter component 116.

In an embodiment, at least a portion of a circumferential surface of the filter press ring 118, parallel to the central axis 120, may define a second threaded portion 410. The second threaded portion 410 of the filter press ring 118 (threads have not been shown in the figures) may be configured to couple with the first threaded portion 408 of the filter ring 114, when the filter assembly 112 is assembled. The filter press ring 118 may define a third aperture 414 extending away from a center of the filter press ring 118 to allow the light to pass through it. The filter press ring 118 may be configured to hold the filter component 116 in its place. The filter ring 114 may be configured to receive the filter press ring 118 in a manner that at least a portion of the filter press ring 118 overlaps at least a portion of the filter component 116 on its one side, when assembled.

Figure 5:
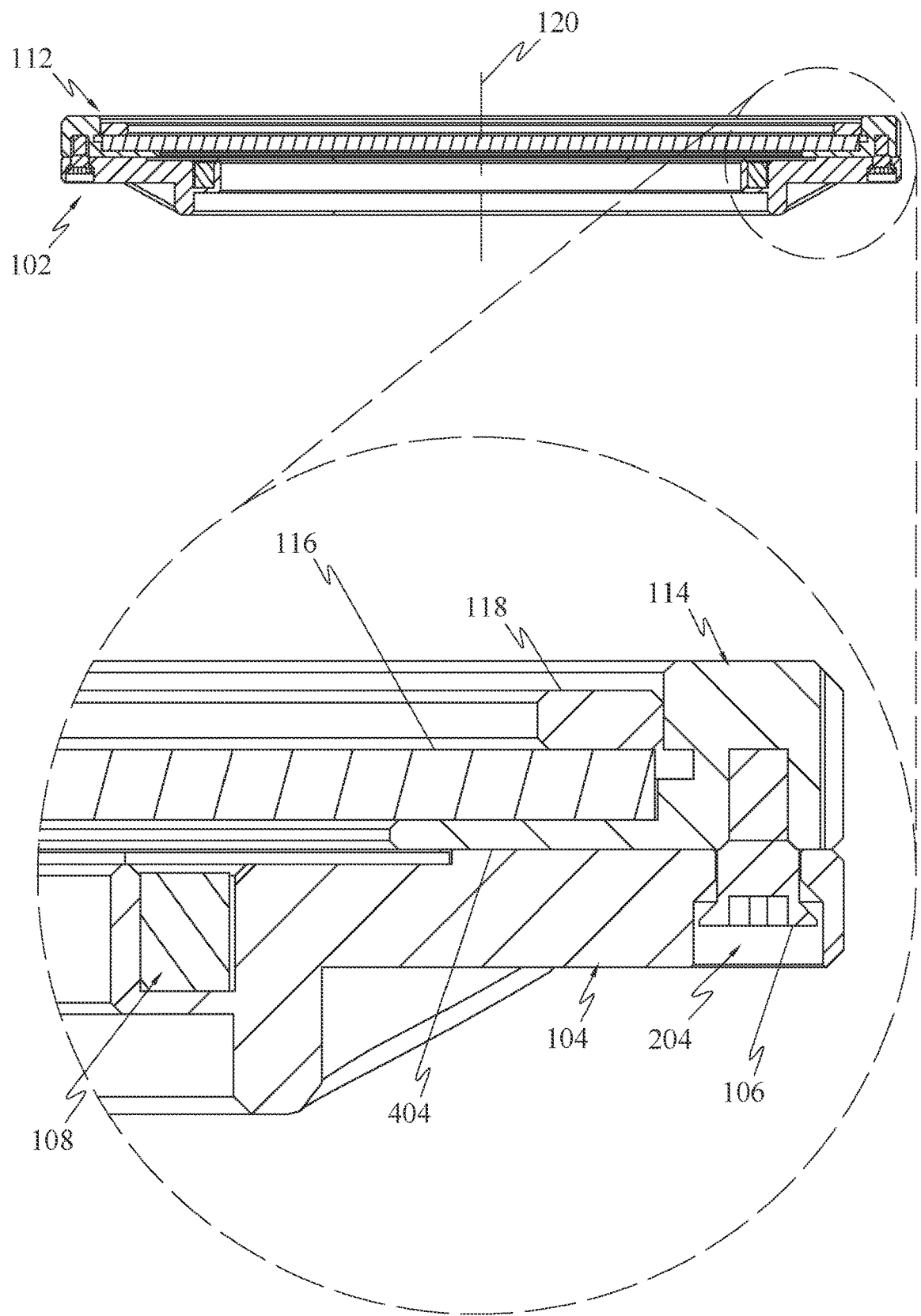
FIG. 5 illustrates a detailed cross-sectional view of the mobile phone filter assembly 100 taken along the section plane A-A 101.

FIG. 5 illustrates a detailed cross-sectional view of the mobile phone filter assembly 100 taken along the section plane A-A 101, in accordance with an embodiment. As shown in FIG. 5, the fixing assembly 102, and the filter assembly 112 are assembled. The positioning holes 206 may be aligned with the holes 406. The positioning holes 206 of the base 104 of the fixing assembly 102 when aligned with the holes 406 of the filter ring 114 of the filter assembly 112 may be configured to receive the screws 106, in a manner that the threaded portions provided on the screws 106 and the holes 406 couple with each other thereby coupling the fixing assembly 102 with the filter assembly 112. The fixing assembly 102 when assembled with the filter assembly 112, at least a portion of the filter ring front side 416 interfaces with at least a portion of the second platform 306 of the base 104.

In an embodiment, a filter cover (not shown in the figures) may be provided to protect the filter component 116 from dust, water droplets, and/or unwanted particles. The filter cover for the mobile phone filter assembly 100 may reduce maintenance issues and retains the overall quality of the product for a longer time. While the installation is firm, filter components of various specifications can be used for combined installation, which not only improves the efficiency of switching filter components, but also improves the user experience.

Further, the cooperation between filter ring 114, and the filter press ring 118 enables the mobile phone filter 100 to be used with a variety of filters. Combined use of variety of filters with different functions, enriches the content shot on any camera device. The mobile phone filter assembly 100 of the present invention is convenient to use, provides faster installation and replacement, includes built-in magnetic structure for VND and ND filter or other special effect filters and filter bases that provides strong adsorption force, convenient and faster disassembly and assembly.

Although embodiments have been described with reference to specific example embodiments, it will be evident that various modifications and changes may be made to these embodiments without departing from the broader spirit and scope of the circuit and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A mobile phone filter assembly, wherein the mobile phone filter assembly comprises of:
a fixing assembly, wherein the fixing assembly comprises:
a base comprising:
a base front side and a base rear side; and
a plurality of positioning holes provided towards a circumference of the base;
at least one magnet disposed towards the base rear side; and
a polyester film disposed over the at least one magnet towards the base rear side; and
a filter assembly configured to be detachably coupled with the fixing assembly, wherein the filter assembly comprises:
a filter ring configured to be detachably coupled to the base;
a filter component configured to be received by the filter ring; and
a filter press ring configured to be received over the filter component in a manner that the filter component is sandwiched between the filter press ring and the filter ring, wherein the filter press ring is configured to hold the filter component in its place.

2. The mobile phone filter according to claim 1, wherein the base defines a first groove towards the base rear side, wherein the first groove is configured to receive the at least one magnet.

3. The mobile phone filter according to claim 2, wherein:
the base defines a first platform towards the base rear side around a central axis;
the first platform extends away from the first groove; and
the first platform is configured to receive the polyester film.

4. The mobile phone filter according to claim 3, wherein at least a portion of the filter ring overlaps at least a portion of the polyester film, when the mobile phone filter assembly is assembled.

5. The mobile phone filter according to claim 3, wherein when the fixing assembly is assembled:
at least a portion of the polyester film towards the central axis overlaps at least a portion of the first groove; and
at least a portion of the polyester film away from the central axis overlaps at least a portion of the first platform.

6. The mobile phone filter according to claim 1, wherein:
the filter ring defines a third platform, wherein the third platform is configured to receive the filter component; and
the filter ring comprises of a second protrusion, wherein the second protrusion extends in a direction parallel to a central axis and away from the third platform.

7. The mobile phone filter according to claim 6, wherein at least a portion of the second protrusion, towards the second platform, defines a first threaded portion.

8. The mobile phone filter according to claim 7, wherein:
at least a portion of a circumferential surface of the filter press ring, parallel to the central axis, defines a second threaded portion; and the second threaded portion is configured to couple with the first threaded portion of the filter ring.

9. The mobile phone filter according to claim 8, wherein the second protrusion is provided with at least one hole towards a filter ring front side, wherein the at least one hole is configured to receive at least one screw for detachably coupling the fixing assembly to the filter assembly.

10. The mobile phone filter according to claim 8, wherein when the filter assembly and the fixing assembly are assembled, at least a portion of the third platform of the filter ring interfaces with at least a portion of the second platform of the base.

11. The mobile phone filter according to claim 1, wherein:
the base defines a first aperture extending from a center of the base;
the filter ring defines a second aperture extending from a center of the filter ring; and
the filter press ring defines a third aperture extending from a center of the filter press ring.

12. The mobile phone filter according to claim 11, wherein,
the base, on its base front side, is provided with a first protrusion, wherein the first protrusion extends away from the base front side; and
the first protrusion enables detachable coupling of the base with an external component.

13. The mobile phone filter according to claim 1, wherein the filter component is made of glass.

\* \* \* \* \*